June 1, 1926.

S. T. NICHOLSON

FLOAT BALL

Filed April 16, 1925

1,587,404

BLANKING

FORMING

WELDING SPUD

WELDING FLANGE

HEAT TREATMENT

POLISHING AND PLATING.

INVENTOR
SAMUEL T. NICHOLSON
BY
ATTORNEYS

Patented June 1, 1926.

1,587,404

UNITED STATES PATENT OFFICE.

SAMUEL T. NICHOLSON, OF WILKES-BARRE, PENNSYLVANIA, ASSIGNOR TO W. H. NICHOLSON & COMPANY, OF WILKES-BARRE, PENNSYLVANIA, A CORPORATION OF PENNSYLVANIA.

FLOAT BALL.

Application filed April 16, 1925. Serial No. 23,629.

My invention relates to floats, and particularly to floats adapted for use under high pressure and high temperature conditions. The object of my invention is to provide a float having certain features of novel construction which adapt it for such service.

In the accompanying drawings—

Figure 1:
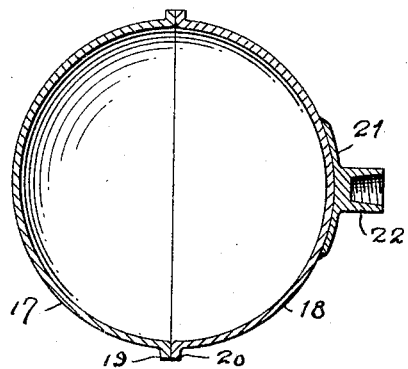
Fig. 1 is a vertical section through a float in which my invention is embodied in one form.
Figure 2:
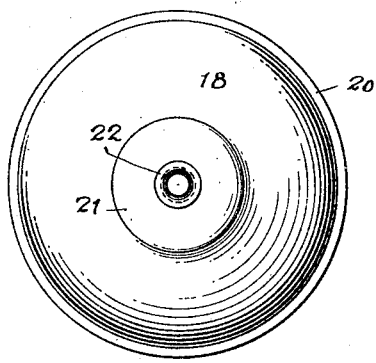
Fig. 2 is a side elevation thereof viewed at right angles to Fig. 1.
Figure 3:
Figure 4:
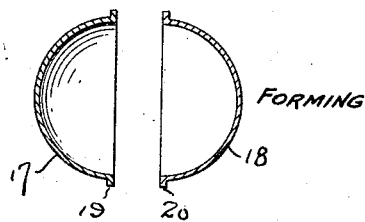
Figure 5:
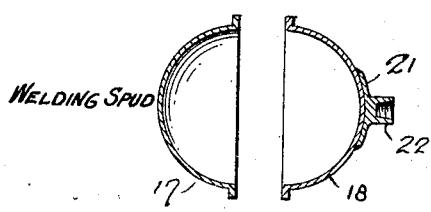
Figure 6:
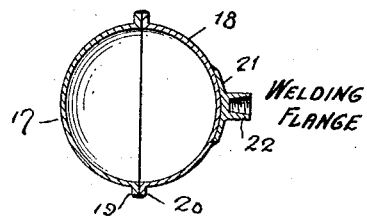
Figure 7:
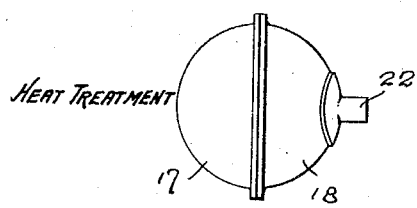
Figure 8:
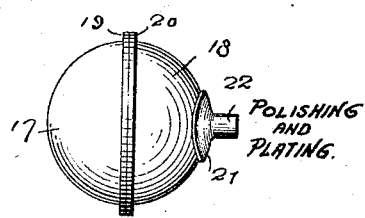

Figs. 3 to 8 inclusive illustrate the successive steps by which the float is built.

Floats intended for service under high pressure and temperature conditions are now commonly made of copper. While such floats may be satisfactory if they are subjected to pressures not exceeding 150 to 200 pounds, and relatively low temperature, they fail at higher temperatures and pressures since copper soon anneals under these conditions and the float collapses. Constant trouble is experienced through such failures, and no remedy has heretofore been found, so far as I am aware.

My invention provides a float which, by reason of the metal of which it is formed, and the method of its construction, is capable of durable service under temperatures as high as 750° F. and pressures up to 1000 pounds—conditions which no float has heretofore successfully withstood.

While the shape of the float may vary, I prefer the spherical type illustrated in the accompanying drawings. The float body is made from a pair of discs 15—16 blanked from sheet metal, such as chrome-nickel steel, stainless steel, Monel metal, brass, or other sheet metal which possesses sufficient tensile strength. For highest pressure and temperature conditions I prefer chrome-nickel steel, which possesses the greatest tensile strength. The two blanks are pressed into like cups or hemispheres 17—18 with uninterrupted surfaces, each provided with a peripherally complete marginal flange 19—20. The foot 21 of a spud 22 is then exteriorly welded to the crown of one of the cups, the welding operation being performed at this stage of the manufacture of the float in order that any injury to the cup or hemisphere incident to the welding operation may be prevented, or detected and cured. Following the welding of the spud, the two hemispheres are welded together at their flanges 19 and 20. All parts of the float are now structurally united and sealed. In order to impart to the metal the greatest possible rigidity, the entire float is now placed in a tempering furnace and given a tempering treatment. Following the tempering treatment the float is polished and is then given a surface treatment to prevent corrosion. For example, the float can be plated with nickel, copper, tin or lead, or it may be merely galvanized.

For very high temperatures and pressures I prefer to use chrome-nickel steel tempered and nickel plated. The welding operation may be effected in any appropriate fashion. I prefer, however, electric welding both of the spud to the crown of one of the cups, and of the flanges 19—20 to each other.

The finished article is not only mechanically strong, but free from any danger of leakage at the joint between the flanges, by reason of the location of the spud at the crown of the hemisphere, while the finishing treatment prevents corrosion of either the spud or the body of the float. It is particularly fitted for use in steam traps, but is equally suited for use in air traps, water columns, feed water heaters, and other power plant instrumentalities.

As above stated, the float may be made of any desired shape without departing from my method of construction or having characteristics which materially differ from those of the article which I claim as my invention.

I claim—

1. As a new article of manufacture, a high pressure float comprising complementary uninterrupted cupped sheet metal members with peripherally complete marginal flanges welded together, a spud having a foot piece exteriorly welded to the crown of one of the cupped members, said cupped members and spud being tempered for strength and surface treated to prevent corrosion.

2. As a new article of manufacture, a high pressure float comprising complementary uninterrupted cupped sheet metal members of chrome-nickel steel having peripherally complete marginal flanges united by an electrical weld, a spud having a foot piece electrically welded to the outer surface of the crown of one of the cupped members, said cupped members and spud being tempered for strength and metal plated to prevent corrosion.

3. The method of manufacturing a high pressure float, which comprises forming blanks of high tensile sheet metal into uninterrupted complementary cups having peripherally complete marginal flanges, welding the foot of a spud to the exterior of the crown of one of said cupped members, welding the cupped members together at the peripherally complete marginal flanges, tempering the structure so formed and finally treating its exposed surfaces to prevent corrosion.

In testimony whereof I have signed my name to this specification.

SAMUEL T. NICHOLSON.